United States Patent
Hu et al.

(10) Patent No.: US 7,200,533 B2
(45) Date of Patent: Apr. 3, 2007

(54) METHOD FOR RAPID FORMATION OF A STOCHASTIC MODEL REPRESENTATIVE OF A HETEROGENEOUS UNDERGROUND RESERVOIR, CONSTRAINED BY DYNAMIC DATA

(75) Inventors: Lin-Ying Hu, Rueil Malmaison (FR); Mickaële Le Ravalec-Dupin, Ploemeur (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 531 days.

(21) Appl. No.: 10/695,899

(22) Filed: Oct. 30, 2003

(65) Prior Publication Data

US 2004/0138862 A1   Jul. 15, 2004

(30) Foreign Application Priority Data

Oct. 30, 2002   (FR)   .................................. 02 13632

(51) Int. Cl.
 G06F 17/50   (2006.01)
 G01V 11/00   (2006.01)
(52) U.S. Cl. ................... 703/2; 703/10; 702/6; 702/11; 702/17
(58) Field of Classification Search .................... 703/2, 703/10; 702/6, 12, 14, 11, 17; 708/806, 708/819
See application file for complete search history.

(56) References Cited

U.S. PATENT DOCUMENTS

| | | | | |
|---|---|---|---|---|
| 5,729,451 A | * | 3/1998 | Gibbs et al. ................... | 702/12 |
| 5,798,982 A | * | 8/1998 | He et al. ....................... | 367/73 |
| 6,067,340 A | * | 5/2000 | Eppstein et al. ................ | 378/4 |
| 6,246,963 B1 | | 6/2001 | Cross et al. | |
| 2002/0042702 A1 | * | 4/2002 | Calvert et al. ................ | 703/10 |
| 2005/0010383 A1 | * | 1/2005 | Le Ravalec-Dupin et al. .......................... | 703/10 |

FOREIGN PATENT DOCUMENTS

FR   2 780 798   1/2000

* cited by examiner

*Primary Examiner*—Thai Phan
(74) *Attorney, Agent, or Firm*—Antonelli, Terry, Stout & Kraus, LLP.

(57) ABSTRACT

A method for rapidly forming a stochastic model of Gaussian or related type, representative of a porous heterogeneous medium such as an underground reservoir, constrained by data characteristic of the displacement of fluids. The method comprises construction of a chain of realizations representative of a stochastic model (Y) by gradually combining an initial realization of (Y) and one or more other realization(s) of (Y) referred to as a composite realization, and minimizing an objective function (J) measuring the difference between a set of non-linear data deduced from the combination by means of a simulator simulating the flow in the medium and the data measured in the medium, by adjustment of the coefficients of the combination. The composite realization results from the projection of the direction of descent of the objective function, calculated by the flow simulator for the initial realization, in the vector subspace generated by P realizations of (Y), randomly drawn and independent of one another, and of the initial realization. During optimization, the chain is explored so as to identify a realization that allows minimizing the objective function (J). In order to sufficiently reduce the objective function, sequentially constructed chains are explored by taking as the initial realization the optimum realization determined for the previous chain. The method may be used for development of oil reservoirs.

16 Claims, 3 Drawing Sheets

METHOD FOR RAPID FORMATION OF A STOCHASTIC MODEL REPRESENTATIVE OF A HETEROGENEOUS UNDERGROUND RESERVOIR, CONSTRAINED BY DYNAMIC DATA

BACKGROUND OF THE INVENTION

1. Field of the Invention

The present invention relates to a method for more rapidly forming a stochastic numerical model of Gaussian or a related type, representative of a porous heterogeneous medium (such as a hydrocarbon reservoir for example) calibrated in relation to data referred to as dynamic data, characteristic of the displacement of fluids in the medium such as, for example, production data (pressures obtained from well tests, flow rates, etc.).

2. Description of the Prior Art

Optimization in a stochastic context consists in determining realizations of a stochastic model which meet a set of data observed in the field. In reservoir engineering, the realizations to be identified correspond to representations, in the reservoir field, of the distribution of carrying properties such as the permeability or porosity. These realizations form numerical reservoir models. The available data are, for example, isolated permeability or porosity measurements, a spatial variability model determined according to isolated measurements or data directly related to the fluid flows in an underground reservoir, that is pressures, breakthrough times, flow rates, etc. The data are often not linearly related to the physical properties to be modelled. A randomly drawn realization is generally not in accordance with the whole of the data collected. Coherence in relation to the data is integrated in the model by means of an inverse procedure See Tarantola, A., "Inverse Problem Theory—Methods for Data Fitting and Model Parameter Estimation", Elsevier Science Publishers, 1987.

The simplest technique is therefore the trial-and-error method. This approach randomly takes realizations until a realization meeting the data is obtained. It affords the advantage of conservation of the spatial variability of the model but requires prohibitive calculation time. It is therefore very rarely used in practice.

An option that is often preferred is based on gradients calculation. The gradients methods allow modifying an initial realization in a direction of search which is estimated from the gradients. The modifications are applied iteratively until data calibration is considered to be acceptable. The gradients methods are attractive because of their efficiency. However, they are no longer suitable when the number of parameters, that is the number of permeability and porosity values forming the numerical model, is large. Besides, they do not allow modifying the realizations while respecting the spatial structure of the stochastic model.

More recently, a geostatistical parameterization technique has been introduced to constrain, by gradual deformation, the stochastic realizations to data on which they depend non-linearly. This technique is described in French patents 2,780,798 and 2,795,841 of the assignee, and in the following publications, notably:

Hu, L. Y., 2000, Gradual Deformation and Interative Calibration of Gaussian-Related Stochastic Models: Math. Geology, Vol. 32, No. 1, Le Ravalec, M. Et al., 2000, The FFT Moving Average (FFT-MA) Generator: An Efficient Numercial Method for Generating and Conditioning Gaussian Simulations: Math. Geology, Vol. 32, No. 6, Hu, L. Y., Blanc, G. And Noetinger, B. (2001): Gradual Deformation and Interative Calibration of Sequential Stochastic Simulations. Math. Geology, Vol. 33, No. 4.

This method has been successfully applied in various cases, notably from data obtained from oil development fields, as described in the following documents:

Roggero, F. et al., 1998, Gradual Deformation of Continuous Geostatistical Models for History Matching, paper SPE 49004: Proc. SPE Annual Technical Conference and Exhibition, New Orleans, Hu, L. Y. et al., 1998, Constraining a Reservoir Facies Model to Dynamic Data Using a Gradual Deformation Method, paper B-01: Proc. 6th European Conference on Mathematics of Oil Recovery (ECMOR VI), 8–11 Sep. 1998, Peebles, Scotland.

As described in detail hereafter, the gradual deformation method allows gradual modification a realization of a stochastic model of Gaussian or a Gaussian-related type while respecting the spatial structure of the model.

Stochastic Optimization

Let $f_{obs}=(f_1^{obs}, f_2^{obs}, f_M^{obs})$ be the field data and $f=(f_1, f_2, \ldots, f_M)$ the corresponding responses simulated for a realization z of a given stochastic model Z. In general, the responses $f=(f_1, f_2, \ldots, f_M)$ are obtained by solving numerically the direct problem. Thus, if z represents a permeability field, data f can be pressure measurements. In this case, they are simulated from a flow simulator. The goal of a stochastic optimization is to produce realizations of Z which reduce the differences between the observed data and the numerically simulated corresponding responses. These differences are measured by the following objective function:

$$J = \frac{1}{2}\sum_{m=1}^{M} \omega_m (f_m - f_m^{obs})^2$$

Coefficients $\omega_m$ are weights assigned to data $f_m^{obs}$. $f_m$ which are functions of realization z. In this sense, minimization of the objective function is a problem with several variables.

Let N be the number of grid cells or of components forming realization z. N is often very large ($10^4$~$10^7$). It is therefore very difficult to perform an optimization directly in relation to the components of z. Furthermore, realization z, even modified, must remain a realization of Z. The gradual deformation method allows these difficulties to be overcome.

Random Search from the Gradual Deformation Method

A random field Z is now considered that can be transformed into a Gaussian random field Y. The gradual deformation technique allows construction of a continuous chain of realizations by combining an initial realization $y_0$ of Y with another realization $u_1$, referred to as complementary, of Y, $u_1$ being independent of $y_0$ (FIG. 1a). The combination coefficients are for example cos(t) and sin(t), and the combined realization meets the relation:

$$y(t) = y_0 \cos t + u_1 \sin t$$

where t is the deformation parameter. Another realization chain construction technique combines the initial realization no longer with one, but with P complementary realizations $u_p$ (p=1,P) of Y (FIG. 1b). The coefficients of the combination are such that the sum of their squares is 1.

Once the chain is formed, it can be explored by varying the deformation parameter t and while trying to identify, from among all the realizations of this chain, the realization which minimizes the objective function. This minimization is performed in relation to t. Parameterization according to the gradual deformation method allows reduction of the number of dimensions of the problem from N to 1, where N is the number of values that constitute the field to be constrained. Furthermore, the sum of the combination coefficients squared being 1, the optimized realization $y(t_{opt})$ still is a realization of Y: The optimized relation follows the same spatial variability model as all the realizations of Y.

However, if the exploration of the realization space is restricted to a single chain, the possibilities of sufficiently reducing the objective function are greatly limited. The above procedure therefore has to be repeated, but with new realization chains. These realization chains are constructed successively by combining an initial realization which is here the optimum realization determined at the previous iteration, with a complementary realization of Y, randomly drawn each time. Thus, at iteration l, the continuous realization chain is written as follows:

$$y_l(t) = y_{l-1} \cos t + u_l \sin t.$$

$y_{l-1}$ is the optimum realization defined at iteration l-1 and the $u_l$ are independent realizations of Y. The latter are also independent of $y_0$. This formulation implies that the realization chain corresponds to a hyperellipse of dimension N.

Minimizing the objective function in relation to t allows improving or at least to preserve calibration of the data each time a new realization chain is explored. This iterative minimum search procedure is continued as long as data calibration is not satisfactory. The random side of the method lies in the fact that, upon each iteration, the complementary realization is drawn at random. In fact, the direction of search that is followed from the optimized realization at the previous stage is random. The direction of search, for a given chain and from the optimum realization defined above, is:

$$\left. \frac{d y_l(t)}{dt} \right|_0 = -y_{l-1} \sin 0 + u_l \cos 0$$
$$= u_l$$

This direction of search only depends on u1. Furthermore, u1 being independent of the complementary realizations already generated $u_1, u_2, \ldots, u_{l-1}$ and also of $y_0$, the direction of search at the start of each new chain is orthogonal to the tangent defined for the previous chain at the same point (FIG. 2). Although it may seem appropriate to select a direction of search orthogonal to this tangent, there is an infinite number of possible orthogonal directions.

Experience shows that, after several iterations, the new directions of search no longer contribute significantly to the decrease of the objective function (FIG. 6).

It has also been considered to combine the initial realization not only with one, but with several complementary realizations. In this case, the number of deformation parameters increases and it is equal to the number of complementary realizations involved in a gradual combination. Although the optimization process is then more flexible, several parameters have to be managed, which is not easy. Besides, such a process is not necessarily more efficient because it can depend on the execution of a larger number of direct flow simulations.

SUMMARY OF THE INVENTION

The method according to the invention allows more rapid formation of a numerical model representative of the distribution of a physical quantity in a porous heterogeneous medium such as an underground zone (oil reservoirs, aquifers, etc.), constrained by data collected in the medium (dynamic data characteristic of the displacement of fluids in the medium), collected by measurements (in production, injection or observation wells for example) or previous observations.

The method according to the invention has applications for underground zone modelling that generates representations showing how a physical quantity is distributed in a subsoil zone (permeability notably), best compatible with observed or measured data, in order for example to favor the development thereof.

It comprises an iterative process of gradual deformation wherein an initial realization of at least part of the selected model of the medium is linearly combined with at least a second realization independent of the initial realization, the coefficients of this linear combination being such that the sum of their squares is 1, and an objective function measuring the difference between a set of non-linear data deduced from the combination by means of a medium simulator and the geologic and dynamic data is minimized by adjusting the coefficients of the combination, the iterative process being repeated until an optimum realization of the stochastic model is obtained.

With the method the rate of gradual deformation to the optimum model representative of the medium is accelerated by selecting as the second realization to be combined with the initial realization at least one composite realization obtained by selecting beforehand a direction of descent defined as a function of the gradients of the objective function in relation to all the components of the initial realization.

The composite realization is obtained for example by linear combination of a set of independent realizations of the model, the coefficients of the combination being calculated so that the direction of descent from the initial realization y is as close as possible to the realization defined by the gradients of the objective function in relation to all the components of the initial realization.

Optimization is for example carried out from a deformation parameter which controls the combination between the initial realization and the composite realization.

In cases where the combination affects only part of the initial realization, the iterative process of gradual deformation is applied to Gaussian white noise used to generate a Gaussian realization and the derivatives of the objective function with respect to the components of the Gaussian white noise are determined.

According to an implementation mode, the initial realization is combined with a certain number M of composite realizations, all obtained by composition from $P_m$ independent realizations of Y, the optimization involving M parameters.

In other words, the method comprises a new gradual combination scheme which accounts for the information provided by the gradients at the initial point of any chain of realizations. Construction of a chain always starts from an initial realization and from a set of complementary realizations, all independent and coming from the same stochastic model. The initial realization is however not directly combined with the complementary realizations. The complementary realizations make it possible to explore the realizations space in different directions. These directions are not equivalent: some better approach to the optimum. At this stage, a realization referred to as composite realization is elaborated by combining the complementary realizations only. A chain of realizations is then created from the initial realization and from this composite realization. This chain, like the chain proposed in the basic case of gradual deformation, can be explored by means of a single deformation parameter.

The composite realization is constructed to provide a direction of search along the chain as close as possible to the direction of descent given by the gradients. As mentioned above, all complementary realizations are not equivalent: the composite realization takes the best of each complementary realization.

The method allows reaching the formation of the numerical model representative of the medium more rapidly.

BRIEF DESCRIPTION OF THE FIGURES

Other features and advantages of the method according to the invention will be clear from reading the description hereafter of an application given by way of non limitative example, with reference to the accompanying drawings wherein.

DETAILED DESCRIPTION OF THE INVENTION

Figure 1:
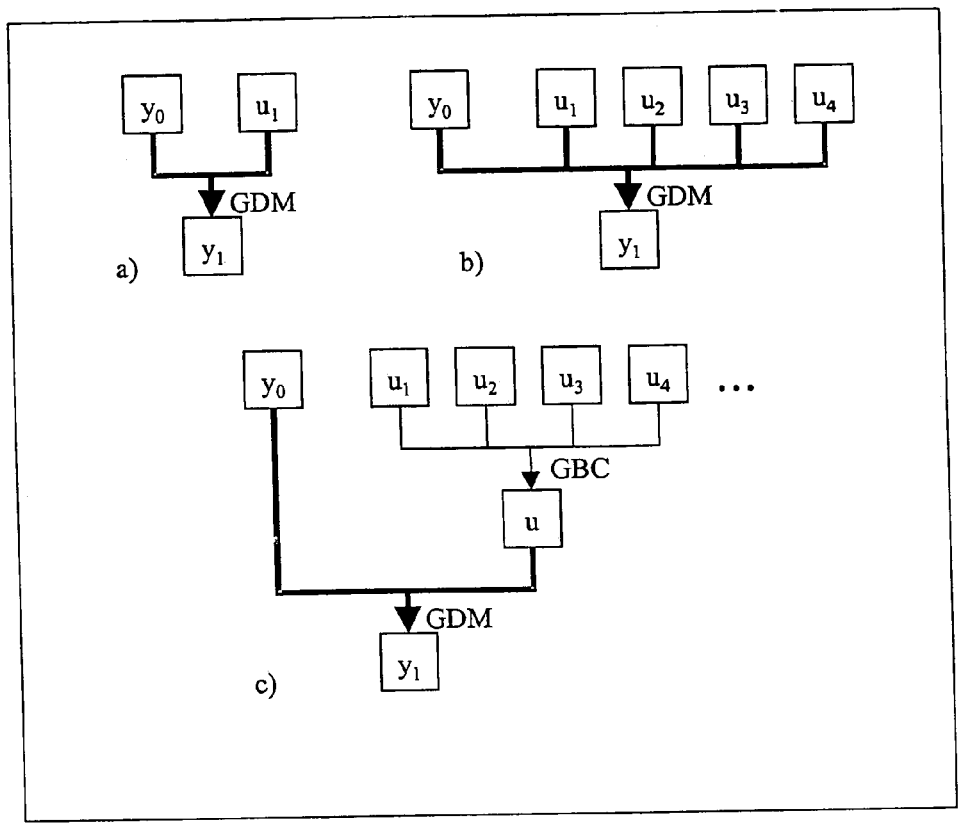
FIGS. 1a, 1b show gradual deformation schemes (referred to as GDM) that are already known.
FIG. 1c shows the gradual deformation scheme (GBC) corresponding to the method according to the invention.
Figure 2:
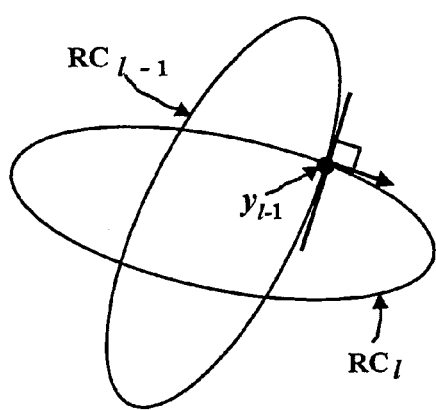
FIG. 2 shows realization chains in a Euclidean space with N dimensions, where the tangent at the level of the optimized realization for a realization chain l-1 ($RC_{l-1}$) is orthogonal to the direction of search for the initial realization of the next realization chain l ($RC_l$)

The method according to the invention allows orienting each iteration of the construction of the realization chain in order to reach a desirable direction of search. The technique selected takes advantage of the information provided by the direction of descent defined by the gradients of the objective function J. The technique can be implemented by means of a numerical simulator of a type known in the art, such as the ATHOS or ECLIPSE simulators.

Search Oriented by the Direction of Descent

At this stage consideration is given to the direction of descent (evolution towards a minimum value, whether local or not) defined by the gradients of the objective function J in relation to all the components of realization z. These gradients are deduced from sensitivity coefficients $\partial f_m/\partial z_n$:

$$\frac{\partial J}{\partial z_n} = \sum_{m=1}^{M} \omega_m (f_m - f_m^{obs})^2 \frac{\partial f_m}{\partial z_n}$$

The problem of sensitivity coefficients calculation has been widely dealt with in the scientific literature. The following document can for example be referred to:

Sun, N. Z., Inverse Problems in Groundwater Modelling, Kluwer Acad. Publ., Dordrecht, The Netherlands, 1994.

In particular, the adjoint state technique allows calculation of all of coefficients by solving the direct problem and the adjoint problem, within a time interval equivalent to twice the time required for solution of the direct problem.

Since the goal is to integrate the information provided by the gradients in the gradual deformation method, going back to the Gaussian realization is necessary which results from the transformation of z. Two cases can be distinguished according to whether isolated conditioning data, that is measurements of z at certain points, are available or not.

When no data are available, if y is the Gaussian realization obtained by transforming z, then:

$$\frac{\partial J}{\partial y_n} = \frac{\partial J}{\partial z_n} \frac{dz_n}{dy_n}.$$

In the opposite case, the assumption is that z is known at certain points α. Thus, the Gaussian realization s, deduced from the transformation of z, is a conditional realization of Y. To obtain s, a non-conditional realization y of Y is generated and conditioned to the values known at α by kriging. The conditional realization is deduced from:

$$s = s^* + (y - y^*).$$

s* and y* are respectively calculated by kriging from the real data and the data of y generated at the level of points α. It can then be shown that:

$$\frac{\partial J}{\partial y_n} = \begin{cases} \frac{\partial J}{\partial z_n} \frac{dz_n}{ds_n}, & \forall n \neq \alpha \\ 0, & \forall n = \alpha \end{cases}$$

For continuous physical properties, $dz_n/dy_n$ or $dz_n/ds_n$ are calculated from the anamorphosis function allowing to transform realization z into a Gaussian realization. When the physical properties considered are category or discrete properties, these derivatives do not exist. The gradients techniques then cannot be applied.

These various relations are of direct interest if a realization just has to be deformed globally. On the other hand, if it is desired to deform the realization locally, the gradual deformation method has to be applied to the Gaussian white noise x used to generate y. In this case, an additonal stage is required: calculation of the derivatives of the objective function with respect to the components of the Gaussian white noise.

To illustrate the calculation of these derivatives, concentration is made on the particular case where the non-conditional Gaussian realization y is obtained from the FFT-MA generator described in the article published by Le Ravalec et al. 2000 mentioned above.

The basic principle of this FFT-MA (FFT-Moving Average) generator is to transform a Gaussian white noise x into a Gaussian realization y correlated from a convolution product:

$$y = g * x.$$

Function g results from the expansion of covariance function C such that $C = g * g^t$, where $g^t$ is the transpose of g. The derivatives of the objective function with respect to the components of the Gaussian white noise are:

$$\frac{\partial J}{\partial x_n} = \sum_l \frac{\partial J}{\partial y_l} \frac{\partial y_l}{\partial x_n}$$

The discrete expression for the convolution product leads to $$y_l = \sum_k g_{l-k} x_k,$$

which implies $\partial y_l / \partial x_n = g_{l-n}$. If this formulation is introduced in the derivatives of the objective function, it can be shown that:

$$\frac{\partial J}{\partial x_n} = \sum_l \frac{\partial J}{\partial y_l} g_{l-n} = \left( \frac{\partial J}{\partial y} * g \right)_n$$

This formula expresses the fact that the derivative of the objective function with respect to the $n^{th}$ component of the Gaussian white noise is given by the $n^{th}$ component of the field obtained by convoluting all the derivatives of the objective function with respect to the components of the Gaussian realization with the kernel of the covariance function. From the framework established for the FFT-MA generator, these derivatives are determined as follows.

1-Calculation of the Fourier transform of $\partial J / \partial y$, these derivatives are obtained by means of the direct numerical simulator;

2-Multiplication of this Fourier transform with that of g that is provided by FFT-MA;

3-Calculation of the inverse Fourier transform of the previous product.

The time required for calculation of these derivatives is negligible: it represents an additional time of ⅔ in relation to the simulation of a Gaussian realization by FFT-MA.

Whatever the realization generator and the direct numerical simulator, it is assumed hereafter that a direction of descent from the derivatives of the objective function can be defined. If optimization of the objective function is performed in relation to this direction of descent only, the coherence of the realization in relation to the spatial variability model is generally destroyed. In the section hereunder, the information provided by the derivatives of the objective function is integrated in the gradual combination scheme.

Taking Account of the Derivatives of the Objective Function in the Gradual Deformation Process The realization chain y1(t) constructed from y0 and from another realization u of Y (FIG. 1a) is considered. Now, instead of using a complementary realization u as it is, P complementary realizations $u_p$ (p=1,2, . . . , P) of Y are randomly drawn and u is substituted for a combination of the $u_{p=1,P}$ (FIG. 1c). This combination is not any combination: it follows the following construction mode:

$$u = \sum_p \lambda_p u_p \text{ with } \sum_p \lambda_p^2 = 1 \qquad (1)$$

The resulting realization u is a realization of Y and it is independent of y0. According to Eq.1, u is also the direction of search calculated for chain $y_1(t)$ at the starting point $y_0$. The method constructs u so that the direction u is as close as possible to the direction of descent given by the gradients at $y_0$.

The space V of the vectors is first defined with N dimensions provided with the scalar product:

$$\langle y_i, y_j \rangle = \frac{1}{N} \sum_{n=1}^{N} y_{i,n} y_{j,n} \quad \forall \, y_i, y_j \in V$$

Figure 3:
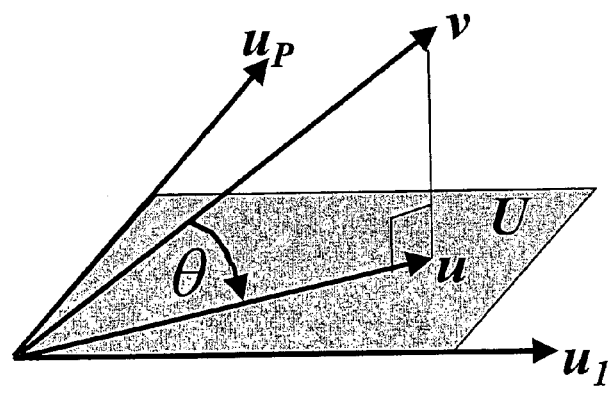
FIG. 3 shows the projection of the direction of descent v in the subspace U defined by the orthonormal base formed by P independent realizations ($u_1, \ldots, u_p$)

$y_{i,n}$ and $y_{j,n}$ are respectively the $n^{th}$ components of vectors $y_i$ and $y_j$. U is defined as a subspace of V defined by the orthonormal base $(u_1, u_2, \ldots, u_p)$. The direction of search in U which is the closest to the direction of descent v is given by the projection of v in U (FIG. 3):

$$v_U = \sum_p \langle v, u_p \rangle u_p$$

By normalizing this vector, the desired direction u is obtained. The combination coefficients $\lambda$ of Eq.(2) are thus:

$$\lambda_p = \langle v, u_p \rangle \Big/ \sqrt{\sum_{q=1}^{P} \langle v, u_q \rangle^2} \quad p = 1, P$$

The realization u thus defined is referred to as composite realization.

So far the construction of realization chains by combination of the initial realization with a composite realization has been considered. This technique can however be generalized to the construction of chains involving a certain number M of composite realizations, all obtained by composition from $P_m$ realizations of Y, these $\Sigma_{m=1}^{M} P_m$ realizations being independent. Optimization then involves M parameters. This technique increases the degree of freedom in the optimization process, but requires management of M optimization parameters.

Numerical Example

A synthetic reservoir model is constructed on which the method according to the invention is tested.

Figure 4A:
FIGS. 4A to 4C show permeability distribution examples respectively for the reference realization, the initial realization and the realization constrained to the pressure data, FIGS. 5A to 5E respectively show the variations as a function of time of the bottomhole pressures respectively simulated for the five wells (BHP-OBS1, BHP-OBS2, BHP-PRO1, BHP-OBS3, BHP-OBS4) of FIG. 4, respectively for the reference (data), initial and constrained (match) permeability distributions.
Figure 4B:
Figure 4C:

The synthetic reference reservoir is shown in FIG. 4A. It is a monolayer reservoir comprising 51×51 grid cells which are 10 m thick and 40 m in side. The permeability distribution is lognormal with an average of 200 mD and a standard deviation of 100 mD. The logarithm of the permeability field is characterized by an isotropic spherical variogram and a correlation length of 480 m. The other petrophysical properties are constant: the porosity is 25%, the total compressibility $5.10^{-4}$ $bar^{-1}$ and the fluid viscosity 1 cP. A production well BHP-PRO1, with a radius of 7.85 cm, free of any skin effect, is at the center of the reservoir and is surrounded by four observation wells (BHP-OBS1, BHP-OBS2, BHP-OBS3, BHP-OBS4) (FIG. 4). A numerical flow simulation allows obtaining, for this reservoir, a set of reference data comprising the bottomhole pressures of the five wells (FIG. 5).

Figure 6:
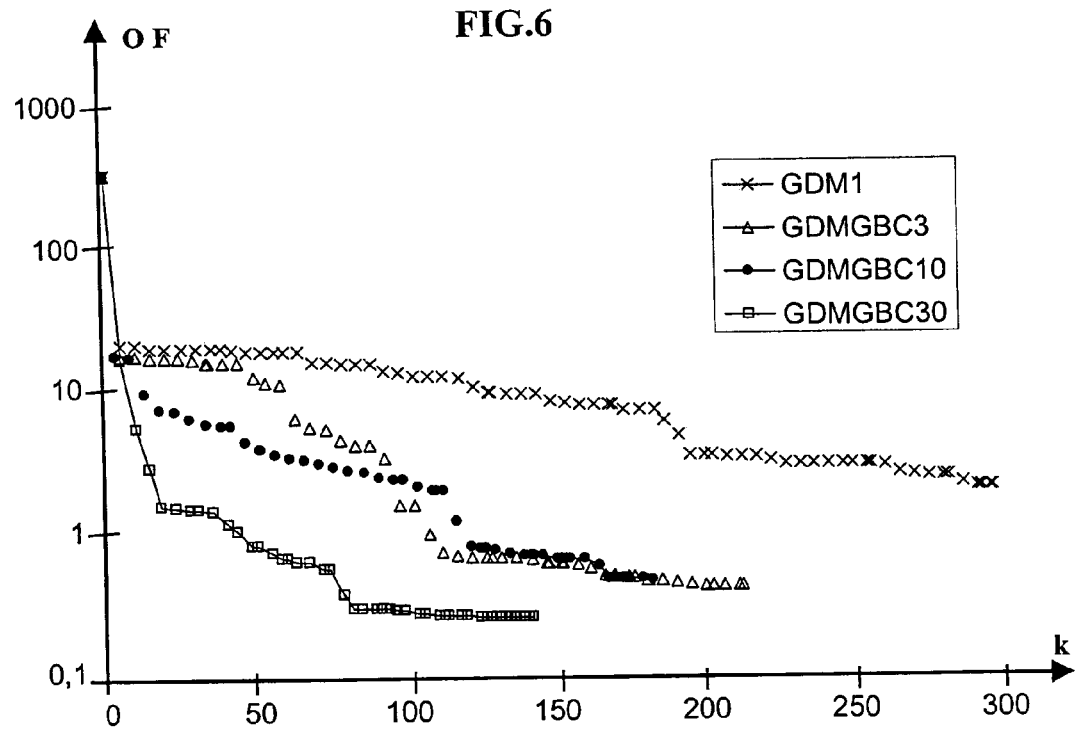
FIG. 6 shows the evolution (OF) of the objective function as a function of the number k of flow simulations performed, GDM1 corresponding to an optimization carried out by combining an initial realization and a single complementary realization, GDMGBC3, to an optimization carried out by combining the initial realization and a composite realization constructed from three complementary realizations, GDMGBC10, to the optimization carried out by combining the initial realization and a composite realization constructed from ten complementary realizations, and GDMGBC30, to an optimization carried out by combining the initial realization and a composite realization constructed from thirty complementary realizations.
Figure 5A:
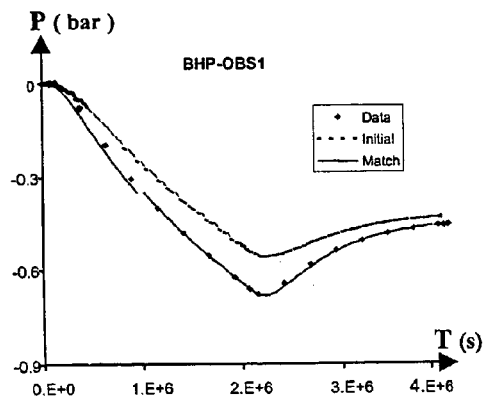
Figure 5B:
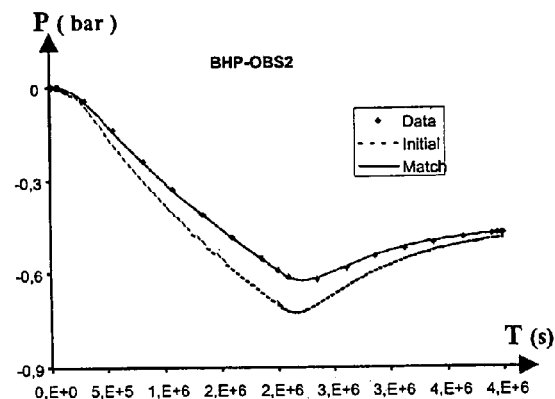
Figure 5C:
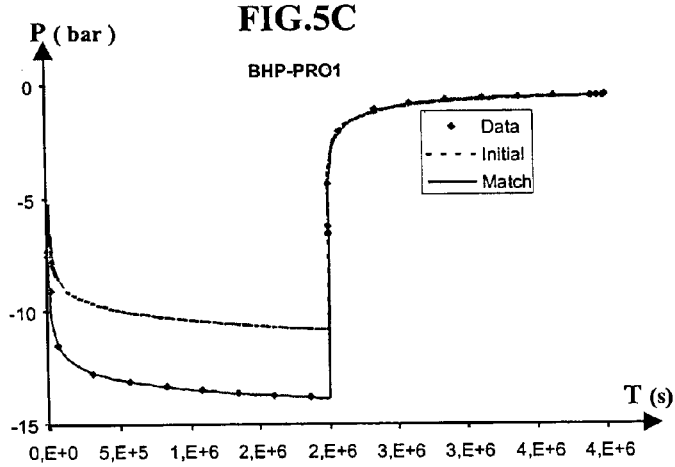
Figure 5D:
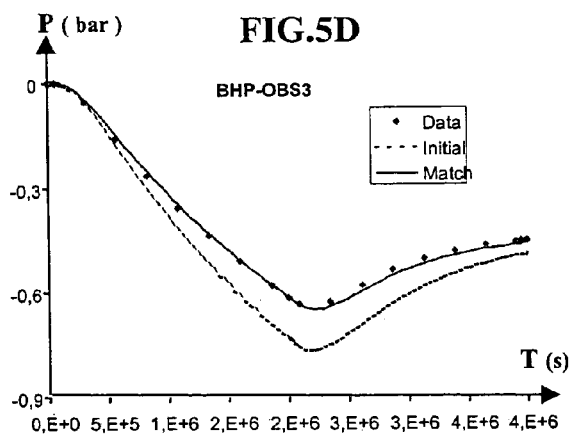
Figure 5E:
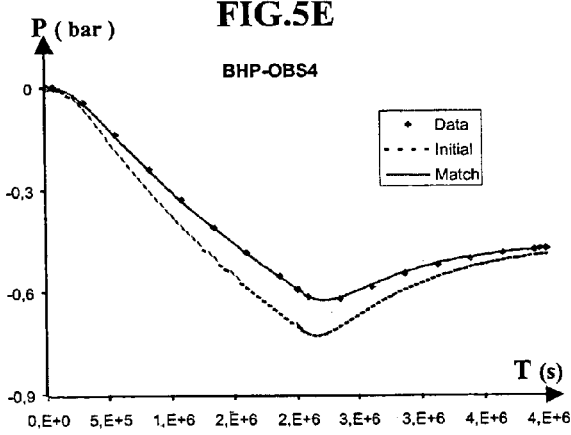

The object of the inverse problem is to determine a reservoir model coherent with the pressure data, the permeabilities distribution being assumed to be unknown. Four optimization processes are therefore launched, starting from the same initial realization (FIG. 4B). For each process, a single optimization parameter is considered, that is the deformation parameter. The first process (GDM1) takes up the conventional gradual deformation scheme with construction of a realization chain using the initial realization and a single complementary realization. The other three processes (GDMGBC3, GDMGBC10 and GDMGBC30) illustrate the application of the method according to the invention: the chains are in this case elaborated with the initial realization and a composite realization obtained from the combination of 3, 10 and 30 complementary realizations. The composite realization is constructed as explained above (Eq.2) by integrating the information provided by the gradients of the objective function with respect to the Gaussian white noise. For each process, the evolution of the objective function (OF) as a function of the number k of flow simulations performed is shown in FIG. 6.

It can be observed that using the gradients and increasing the number of complementary realizations allows the objective function to decrease more rapidly for the same number of flow simulations.

The invention claimed is:

1. A method for speeding up forming a stochastic numerical model of a Gaussian type or a type representative of a distribution of a physical quantity in a porous heterogeneous medium, calibrated in relation to dynamic data obtained by measurements performed in the medium or by previous observations, and a characteristic of displacement of fluids therein, comprising an iterative process of gradual deformation wherein an initial realization of at least part of the medium is linearly combined, upon each iteration, with at least a second realization independent of the initial realization, coefficients of the linear combining being such that a sum of the squares of the coefficients is 1, and an objective function measuring a difference between a set of non-linear data deduced from the linear combining by means of a flow simulator and the dynamic data are minimized by adjusting the coefficients of the linear combining, the iterative process being repeated until an optimum realization of the stochastic model is obtained in which a rate of deformation to an optimum model representative of the medium is accelerated by selecting as the second realization to be combined with the initial realization at least one composite realization obtained by selecting beforehand a direction of descent defined as a function of gradients of an objective function in relation to all the components of the initial realization.

2. A method as claimed in claim 1, wherein the at least one composite realization is obtained by linear combination of a set of P independent realizations of the model, the coefficients of the linear combining being calculated so that a direction of descent from the initial realization is attempted to be made equal to a realization defined by the gradients of the objective function in relation to all components of the initial realization.

3. A method as claimed in claim 2, wherein optimization is carried out from a deformation parameter which controls the combining between the initial realization and the at least one composite realization.

4. A method as claimed in claim 3, wherein the combining of at least a part of an initial realization and the iterative process of gradual deformation is applied to a Gaussian white noise used to generate a Gaussian realization and derivatives of the objective function with respect to components of the Gaussian white noise are determined.

5. A method as claimed in claim 4, wherein the initial realization is combined with a number M of composite realizations with all of the at least one composite realizations being obtained by composition from P independent realizations of a Gaussian random field, the optimum realization involving M parameters.

6. A method as claimed in claim 3, wherein the initial realization is combined with a number M of composite realizations with all of the at least one composite realizations being obtained by composition from P independent realizations of a Gaussian random field, the optimum realization involving M parameters.

7. A method as claimed in claim 2, wherein the combining of at least a part of an initial realization and the iterative process of gradual deformation is applied to a Gaussian white noise used to generate a Gaussian realization and derivatives of the objective function with respect to components of the Gaussian white noise are determined.

8. A method as claimed in claim 2, wherein the initial realization is combined with a number M of composite realizations with all of the at least one composite realizations being obtained by composition from P independent realizations of a Gaussian random field, the optimum realization involving M parameters.

9. A method as claimed in claim 7, wherein the initial realization is combined with a number M of composite realizations with all of the at least one composite realizations being obtained by composition from P independent realizations of a Gaussian random field, the optimum realization involving M parameters.

10. A method as claimed in claim 1, wherein optimization is carried out from a deformation parameter which controls the combining between the initial realization and the composite realization.

11. A method as claimed in claim 10, wherein the combining of at least a part of an initial realization and the iterative process of gradual deformation is applied to a Gaussian white noise used to generate a Gaussian realization and derivatives of the objective function with respect to components of the Gaussian white noise are determined.

12. A method as claimed in claim 11, wherein the initial realization is combined with a number M of composite realizations with all of the at least one composite realizations being obtained by composition from P independent realizations of a Gaussian random field, the optimum realization involving M parameters.

13. A method as claimed in claim 10, wherein the initial realization is combined with a number M of composite realizations with all of the at least one composite realizations being obtained by composition from P independent realizations of a Gaussian random field, the optimum realization involving M parameters.

14. A method as claimed in claim 1, wherein the combining of at least a part of an initial realization and the iterative process of gradual deformation is applied to a Gaussian white noise used to generate a Gaussian realization and derivatives of the objective function with respect to components of the Gaussian white noise are determined.

15. A method as claimed in claim 14, wherein the initial realization is combined with a number M of composite realizations with all of the at least one composite realizations being obtained by composition from P independent realizations of a Gaussian random field, the optimum realization involving M parameters.

16. A method as claimed in claim 1, wherein the initial realization is combined with a number M of composite realizations with all of the at least one composite realizations being obtained by composition from P independent realizations of a Gaussian random field, the optimum realization involving M parameters.

* * * * *